US012776154B2

(12) United States Patent
Ho et al.

(10) Patent No.: US 12,776,154 B2
(45) Date of Patent: Oct. 27, 2026

(54) IDENTIFYING UNCLASSIFIED OBJECTS

(71) Applicant: Motional AD LLC, Boston, MA (US)

(72) Inventors: Bing-Jui Ho, Pittsburgh, PA (US); Holger Caesar, Jalan Lempeng (SG); Qiang Xu, Torrance, CA (US); Oscar Beijbom, Santa Monica, CA (US); Michael Happold, Pittsburgh, PA (US); Sourabh Vora, Marina Del Rey, CA (US)

(73) Assignee: Motional AD LLC, Boston, MA (US)

( * ) Notice: Subject to any disclaimer, the term of this patent is extended or adjusted under 35 U.S.C. 154(b) by 255 days.

(21) Appl. No.: 18/417,281

(22) Filed: Jan. 19, 2024

(65) Prior Publication Data

US 2024/0265715 A1 Aug. 8, 2024

Related U.S. Application Data

(60) Provisional application No. 63/480,931, filed on Jan. 20, 2023.

(51) Int. Cl.
*G06V 20/70* (2022.01)
*G06V 10/764* (2022.01)
*G06V 20/56* (2022.01)
*G06V 20/58* (2022.01)

(52) U.S. Cl.
CPC ............ *G06V 20/70* (2022.01); *G06V 10/764* (2022.01); *G06V 20/58* (2022.01)

(58) Field of Classification Search
CPC ...... G06V 20/70; G06V 10/764; G06V 20/58; G06V 20/56
See application file for complete search history.

(56) References Cited

U.S. PATENT DOCUMENTS

| | | | | |
|---|---|---|---|---|
| 11,158,120 | B1 * | 10/2021 | Jespersen | G06T 5/70 |
| 11,500,099 | B2 * | 11/2022 | Liang | B60W 40/02 |
| 11,747,444 | B2 * | 9/2023 | Chattopadhyay | G01S 17/42 356/5.01 |
| 12,050,273 | B2 * | 7/2024 | Saranin | G01S 17/42 |
| 12,360,213 | B2 * | 7/2025 | Khadem | G06V 10/82 |
| 2021/0253131 | A1 * | 8/2021 | Sen | B60W 60/0027 |

OTHER PUBLICATIONS

Chang, Ming-Fang, et al. "Argoverse: 3d tracking and forecasting with rich maps." Proceedings of the IEEE/CVF conference on computer vision and pattern recognition. 2019. (Year: 2019).*
Wang, Xiaohua, et al. "A new method of 3d point cloud data processing in low-speed self-driving car." 2019 IEEE 3rd Advanced Information Management, Communicates, Electronic and Automation Control Conference (IMCEC). IEEE, 2019. (Year: 2019).*
SAE On-Road Automated Vehicle Standards Committee, "SAE International's Standard J3016 Taxonomy and Definitions for Terms Related to Driving Automation Systems for On-Road Motor Vehicles", Jun. 2018, in 35 pages.

* cited by examiner

*Primary Examiner* — Stephen R Koziol
*Assistant Examiner* — Joshua Chen
(74) *Attorney, Agent, or Firm* — Knobbe, Martens, Olson & Bear, LLP

(57) ABSTRACT

A system receives a 3D image having multiple data points, and uses one or more filters, such as a distance filter, map filter, and/or height filter to remove certain 3D data points from the image. The system may group the data points and annotate them to identify unknown or unclassified objects within the image.

18 Claims, 11 Drawing Sheets

IDENTIFYING UNCLASSIFIED OBJECTS

PRIORITY AND RELATED APPLICATIONS

The present application claims the benefit of U.S. Provisional Application No. 63/480,931 filed on Jan. 20, 2023, entitled IDENTIFYING UNCLASSIFIED OBJECTS. Any and all applications for which a foreign or domestic priority claim is identified in the Application Data Sheet as filed with the present application are hereby incorporated by reference under 37 CFR 1.57.

BACKGROUND

Self-driving vehicles may identify and classify objects in a vehicle scene using images obtained from one or more image sensors.

DETAILED DESCRIPTION

Figure 1:
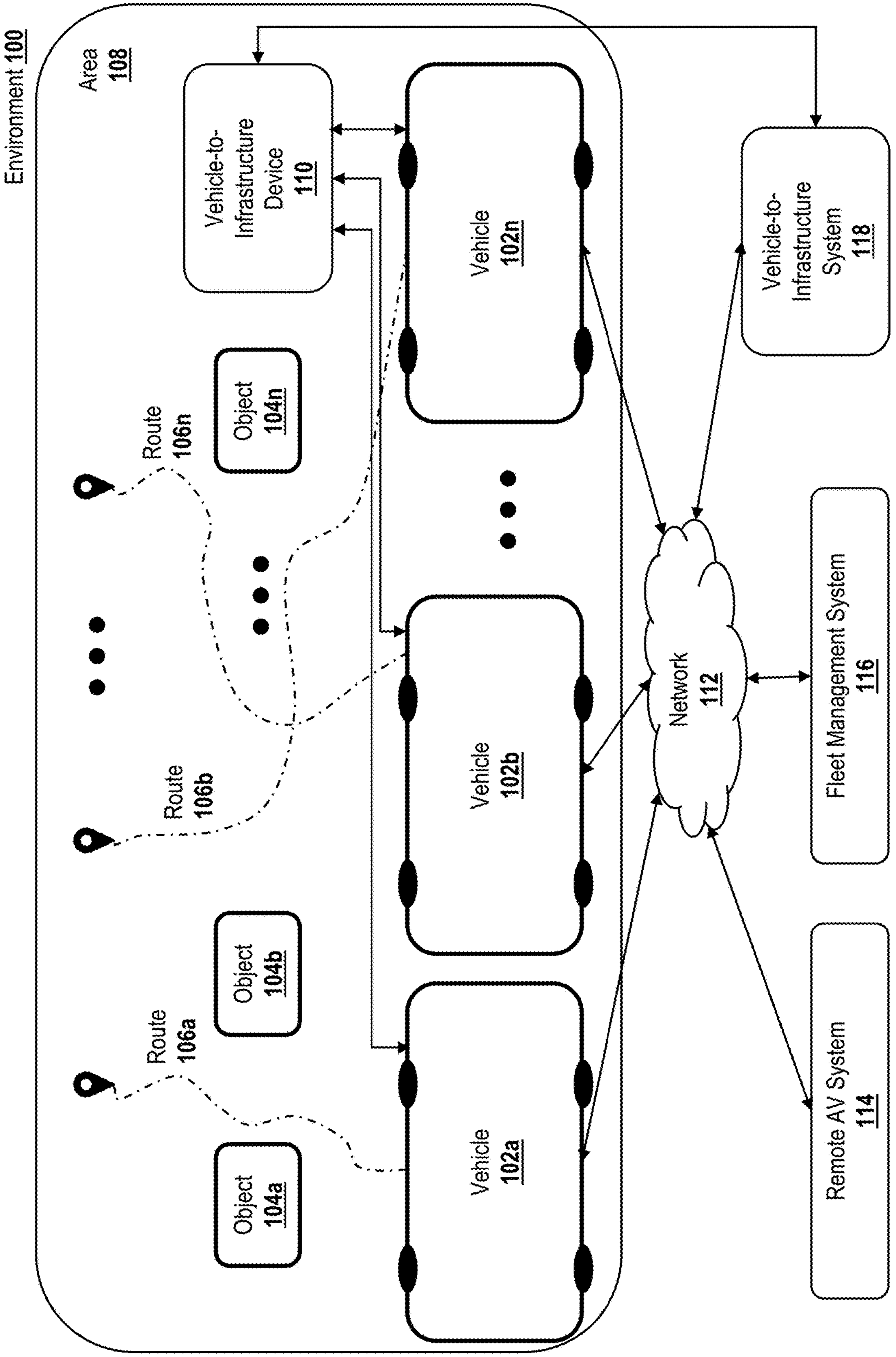
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships, or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. Also, the term "or" is used in its inclusive sense (and not in its exclusive sense) so that when used, for example, to connect a list of elements, the term "or" means one, some, or all of the elements in the list. Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements, or steps are in any way required for one or more embodiments or that one or more embodiments necessarily include logic for deciding, with or without other input or prompting, whether these features, elements or steps are included or are to be performed in any particular embodiment. As used herein, the term "if" is, optionally, construed to mean "when," "upon," "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has," "have," "having," or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

Overview

To effectively navigate through various scenes, autonomous vehicles use computer vision to identify objects in a scene and then navigate the scene based on the identified objects. It can be relatively easier for an autonomous vehicle to identify and classify objects that are seen more frequently, such as object classified as vehicles, pedestrians, etc., than objects that are infrequently observed. For example, it may be more difficult for a machine learning model to accurately detect construction vehicles (e.g., excavator), portable toilets, pilings, luggage, etc. because these types of objects may appear infrequently in images, especially in images used to train the machine learning model.

To address these issues, a system can identify unknown or unclassified objects in images and enable users to annotate the objects for improved machine learning model training. In some cases, the system uses multiple filtering techniques to identify data points (e.g., lidar points, radar points, pixels of a stereo image with location information) within a 3D image (e.g., lidar point cloud, radar point cloud stereo image) that do not correspond to classified objects, and build (3D) bounding boxes that encompass the identified data points. For example, the system may receive a lidar point cloud and remove lidar points from the lidar point cloud that are too close or too far away from the autonomous vehicle, lidar points that are too high or too low, lidar points that are not on a drivable area (e.g., when compared to a map), lidar points that correspond to known or classified objects and/or lidar points that do not satisfy certain temporal constraints, etc. The system may cluster some or all of the lidar points that remain in the point cloud after filtering and/or draw one or more bounding boxes around the clustered lidar points. The system may use similar techniques to remove some data points and group other data points of other types of 3D images, such as but not limited to radar point clouds, stereo images, etc.

By removing some data points and clustering other data points within a 3D image, the system can improve the identification and classification of (unknown) objects. By identifying unknown or unclassified objects, the system may enable improved annotations of these objects in ground truth data. The improved ground truth data may be used to better train machine learning models that can better detect and more accurately classify objects, which can result in safer driving for autonomous vehicles.

Although some examples are described herein with reference to a system processing an image, it will be understood that the system may simultaneously or concurrently process hundreds, thousands, millions, or more images. Moreover, the system may receive a stream of images in real-time or near real-time and process the stream of images in real-time or near real-time to identify the unknown objects found therein. As part of processing the images, the system may use one or more machine learning models. For example, one machine learning model may be used to identify objects in the images, another machine learning model may be used to determine height thresholds, and another machine learning model may be used to group data points of the images and/or generate bounding boxes for the grouped data points, etc. Accordingly, it will be understood that the examples described integrate machine learning models to improve the technical field of autonomous vehicles and computer vision.

General Overview

By virtue of the implementation of systems, methods, and computer program products described herein, an autonomous vehicle can more accurately identify objects within an image, more accurately identify the location of identified objects within the image, more accurately predict trajectories of identified objects within the image, determine additional features for identified objects, and infer additional information about the scene of an image.

Referring now to FIG. 1, illustrated is example environment 100 in which vehicles that include autonomous systems, as well as vehicles that do not, are operated. As illustrated, environment 100 includes vehicles 102*a*-102*n*, objects 104*a*-104*n*, routes 106*a*-106*n*, area 108, vehicle-to-infrastructure (V2I) device 110, network 112, remote autonomous vehicle (AV) system 114, fleet management system 116, and V2I system 118. Vehicles 102*a*-102*n*, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104*a*-104*n* interconnect with at least one of vehicles 102*a*-102*n*, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102*a*-102*n* (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106*a*-106*n* (referred to individually as route 106 and collectively as routes 106), as described herein. In some embodiments, one or more vehicles 102 include an autonomous system (e.g., an autonomous system that is the same as or similar to autonomous system 202).

Objects 104*a*-104*n* (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106*a*-106*n* (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high-level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high-level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
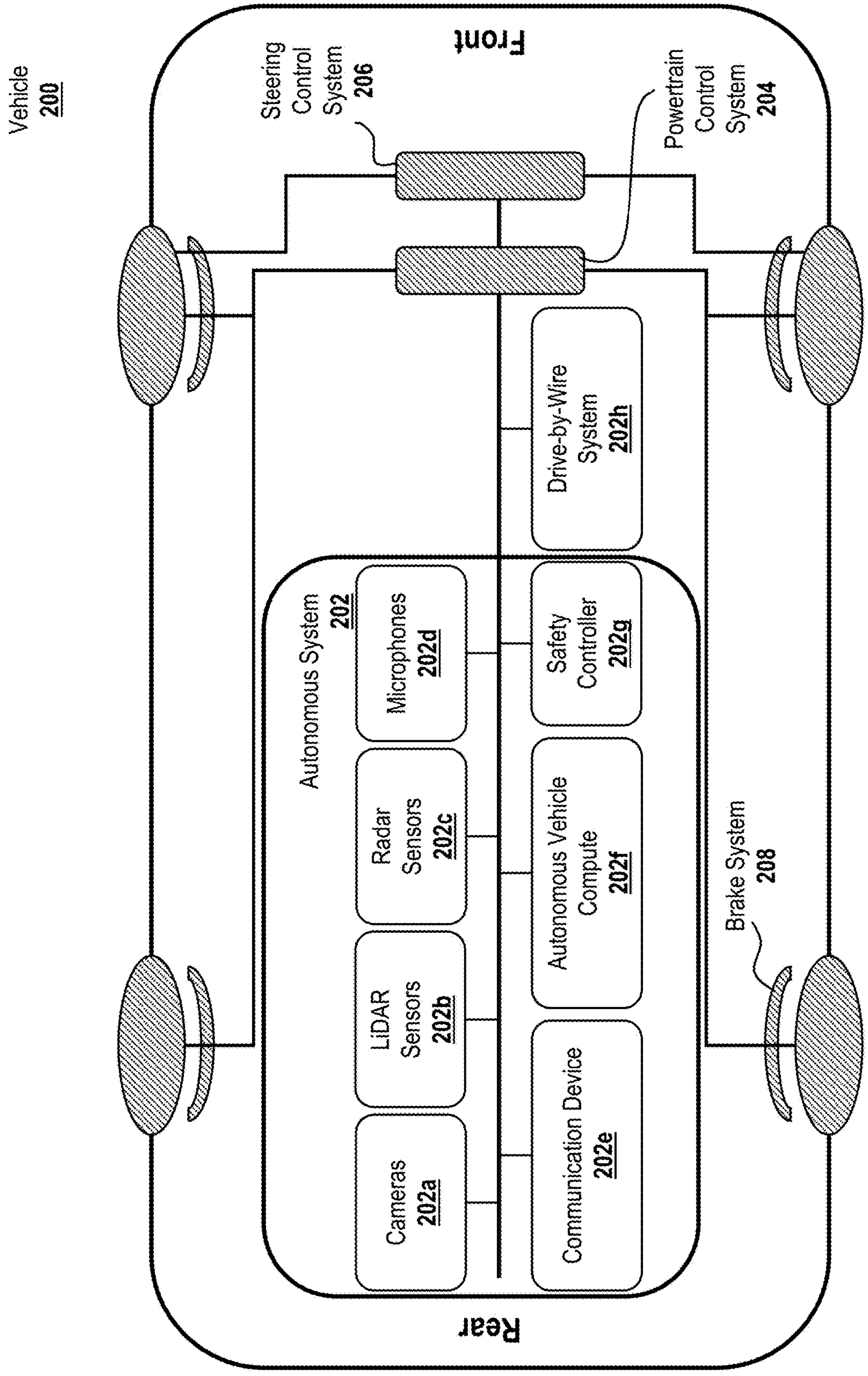
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202*a*, LiDAR sensors 202*b*, radar sensors 202*c*, and microphones 202*d*. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202*e*, autonomous vehicle compute 202*f*, and drive-by-wire (DBW) system 202*h*.

Figure 3:
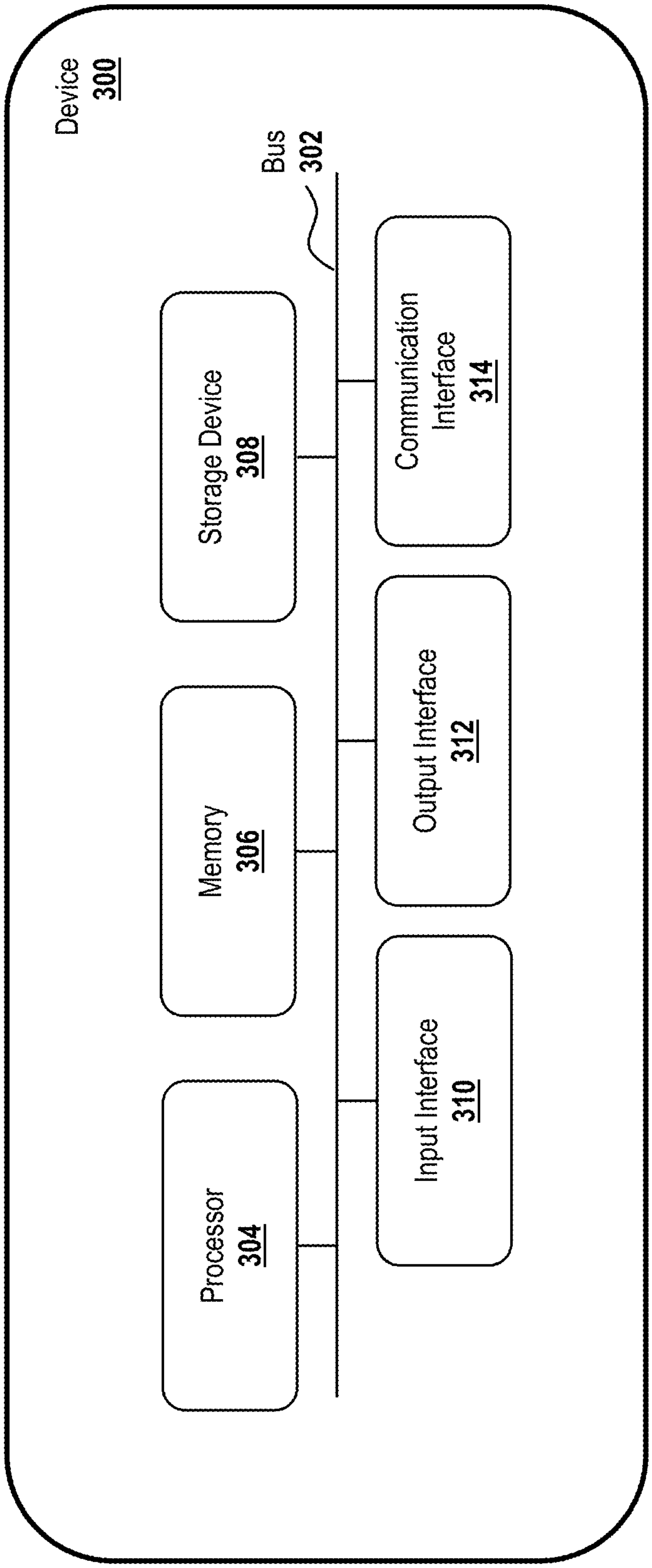
FIG. 3 is a diagram of components of one or more devices and/or one or more systems of FIGS. 1 and 2.

Cameras 202*a* include at least one device configured to be in communication with communication device 202*e*, autonomous vehicle compute 202*f*, and/or safety controller 202*g* via a bus (e.g., a bus that is the same as or similar to bus 302 of FIG. 3). Cameras 202*a* include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202*a* generates camera data as output. In some examples, camera 202*a* generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202*a* includes a plurality of independent cameras configured on (e.g., positioned on) a vehicle to capture images for the purpose of stereopsis (stereo vision). In some examples, camera 202*a* includes a plurality of cameras that generate image data and transmit the image data to autonomous vehicle compute 202*f* and/or a fleet management system (e.g., a fleet management system that is the same as or similar to fleet management system 116 of FIG. 1). In such an example, autonomous vehicle compute 202*f* determines depth to one or more objects in a field of view of at least two cameras of the plurality of cameras based on the image data from the at least two cameras. In some embodiments, cameras 202*a* is configured to capture images of objects within a distance from cameras 202*a* (e.g., up to 100 meters, up to a kilometer, and/or the like). Accordingly, cameras 202*a* include features such as sensors and lenses that are optimized for perceiving objects that are at one or more distances from cameras 202*a*.

In an embodiment, camera 202*a* includes at least one camera configured to capture one or more images associated with one or more traffic lights, street signs and/or other physical objects that provide visual navigation information. In some embodiments, camera 202*a* generates traffic light data associated with one or more images. In some examples, camera 202*a* generates TLD data associated with one or more images that include a format (e.g., RAW, JPEG, PNG, and/or the like). In some embodiments, camera 202*a* that generates TLD data differs from other systems described herein incorporating cameras in that camera 202*a* can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202*b* include at least one device configured to be in communication with communication device 202*e*, autonomous vehicle compute 202*f*, and/or safety controller 202*g* via a bus (e.g., a bus that is the same as or similar to bus 302 of FIG. 3). LiDAR sensors 202*b* include a system configured to transmit light from a light emitter (e.g., a laser transmitter). Light emitted by LiDAR sensors 202*b* include light (e.g., infrared light and/or the like) that is outside of the visible spectrum.

In some embodiments, during operation, light emitted by LiDAR sensors 202*b* encounters a physical object (e.g., a vehicle) and is reflected back to LiDAR sensors 202*b*. In some embodiments, the light emitted by LiDAR sensors 202*b* does not penetrate the physical objects that the light encounters. LiDAR sensors 202*b* also include at least one light detector which detects the light that was emitted from the light emitter after the light encounters a physical object. In some embodiments, at least one data processing system associated with LiDAR sensors 202*b* generates an image (e.g., a point cloud, a combined point cloud, and/or the like) representing the objects included in a field of view of LiDAR sensors 202*b*. In some examples, the at least one data processing system associated with LiDAR sensor 202*b* generates an image that represents the boundaries of a physical object, the surfaces (e.g., the topology of the surfaces) of the physical object, and/or the like. In such an example, the image is used to determine the boundaries of physical objects in the field of view of LiDAR sensors 202*b*.

Radio Detection and Ranging (radar) sensors 202*c* include at least one device configured to be in communication with communication device 202*e*, autonomous vehicle compute 202*f*, and/or safety controller 202*g* via a bus (e.g., a bus that is the same as or similar to bus 302 of FIG. 3). Radar sensors 202*c* include a system configured to transmit radio waves (either pulsed or continuously). The radio waves transmitted by radar sensors 202*c* include radio waves that are within a predetermined spectrum. In some embodiments, during operation, radio waves transmitted by radar sensors 202*c* encounter a physical object and are reflected back to radar sensors 202*c*. In some embodiments, the radio waves transmitted by radar sensors 202*c* are not reflected by some objects. In some embodiments, at least one data processing system associated with radar sensors 202*c* generates signals representing the objects included in a field of view of radar sensors 202*c*. For example, the at least one data processing system associated with radar sensor 202*c* generates an image that represents the boundaries of a physical object, the surfaces (e.g., the topology of the surfaces) of the physical object, and/or the like. In some examples, the image is used to determine the boundaries of physical objects in the field of view of radar sensors 202*c*.

Microphones 202*d* includes at least one device configured to be in communication with communication device 202*e*, autonomous vehicle compute 202*f*, and/or safety controller 202*g* via a bus (e.g., a bus that is the same as or similar to bus 302 of FIG. 3). Microphones 202*d* include one or more microphones (e.g., array microphones, external microphones, and/or the like) that capture audio signals and generate data associated with (e.g., representing) the audio signals. In some examples, microphones 202*d* include transducer devices and/or like devices. In some embodiments, one or more systems described herein can receive the data generated by microphones 202*d* and determine a position of an object relative to vehicle 200 (e.g., a distance and/or the like) based on the audio signals associated with the data.

Communication device 202*e* include at least one device configured to be in communication with cameras 202*a*, LiDAR sensors 202*b*, radar sensors 202*c*, microphones 202*d*, autonomous vehicle compute 202*f*, safety controller 202*g*, and/or DBW system 202*h*. For example, communication device 202*e* may include a device that is the same as or similar to communication interface 314 of FIG. 3. In some embodiments, communication device 202*e* includes a vehicle-to-vehicle (V2V) communication device (e.g., a device that enables wireless communication of data between vehicles).

Autonomous vehicle compute 202*f* include at least one device configured to be in communication with cameras 202*a*, LIDAR sensors 202*b*, radar sensors 202*c*, microphones 202*d*, communication device 202*e*, safety controller 202*g*, and/or DBW system 202*h*. In some examples, autonomous vehicle compute 202*f* includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202*f* is the same as or similar to autonomous vehicle compute 400, described herein. Additionally, or alternatively, in some embodiments autonomous vehicle compute 202*f* is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202*g* includes at least one device configured to be in communication with cameras 202*a*, LiDAR sensors 202*b*, radar sensors 202*c*, microphones 202*d*, communication device 202*e*, autonomous vehicle computer 202*f*, and/or DBW system 202*h*. In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f*.

DBW system 202*h* includes at least one device configured to be in communication with communication device 202*e* and/or autonomous vehicle compute 202*f*. In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h*. In some examples, powertrain control system 204 includes at least one controller, actuator, and/or the like. In some embodiments, powertrain control system 204 receives control signals from DBW system 202*h* and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid-state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally, or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 306 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally, or alternatively, a set of components (e.g., one or more components) of device 300 can perform one or more functions described as being performed by another component or another set of components of device 300.

Figure 4A:
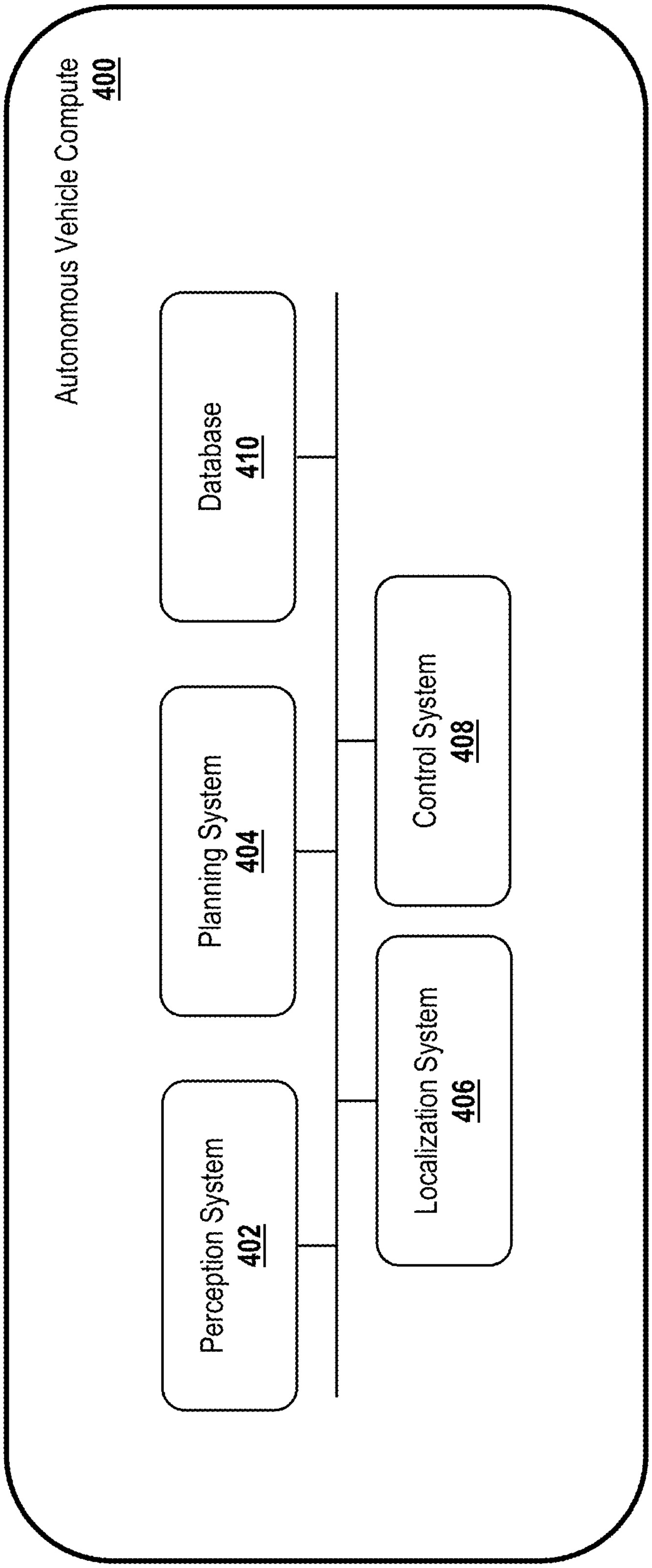
FIG. 4A is a diagram of certain components of an autonomous system.

Referring now to FIG. 4A, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202*f* of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202*a*), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202*b*). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LIDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
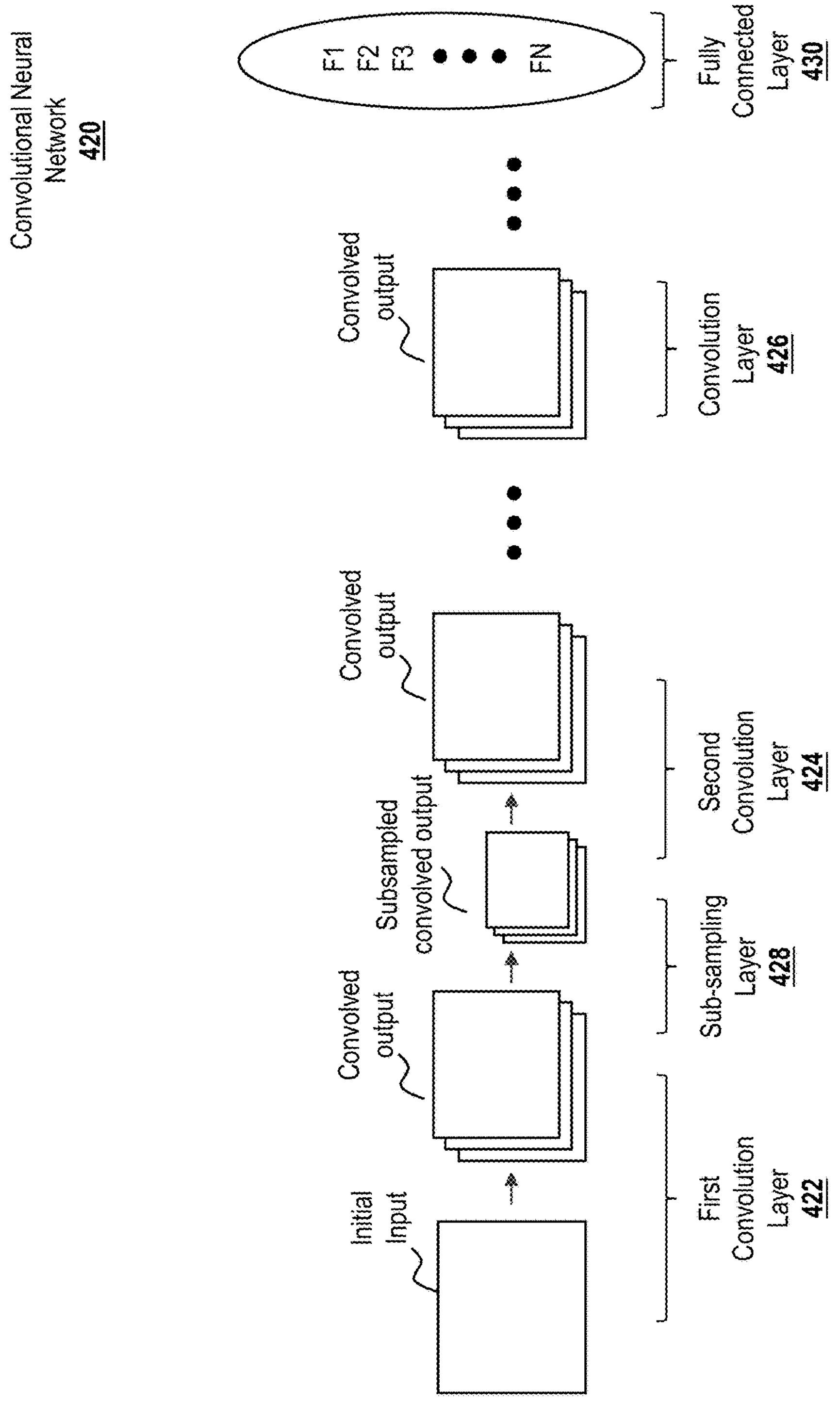
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
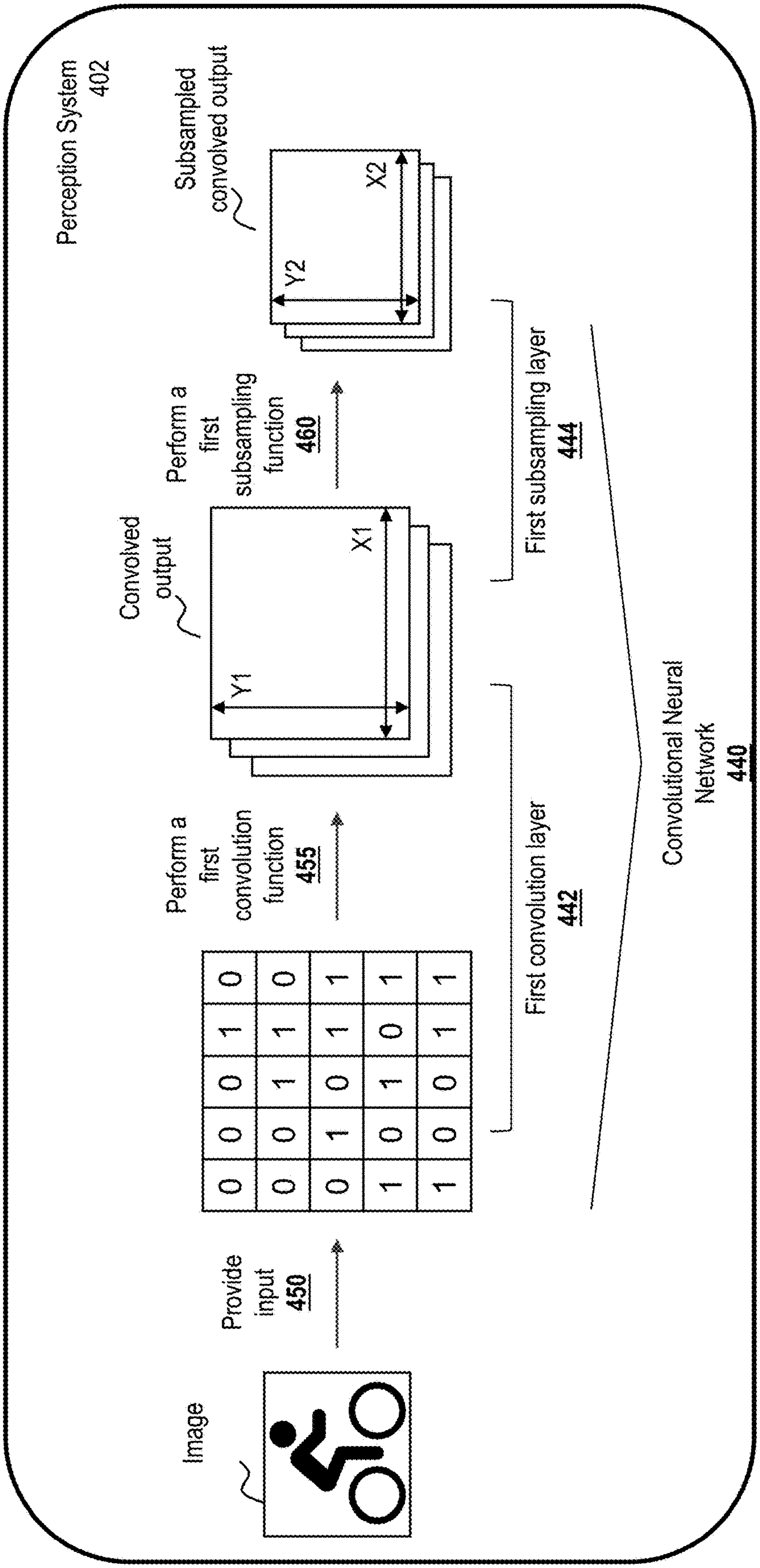
FIGS. 4C and 4D are a diagram illustrating example operation of a CNN.
Figure 4D:
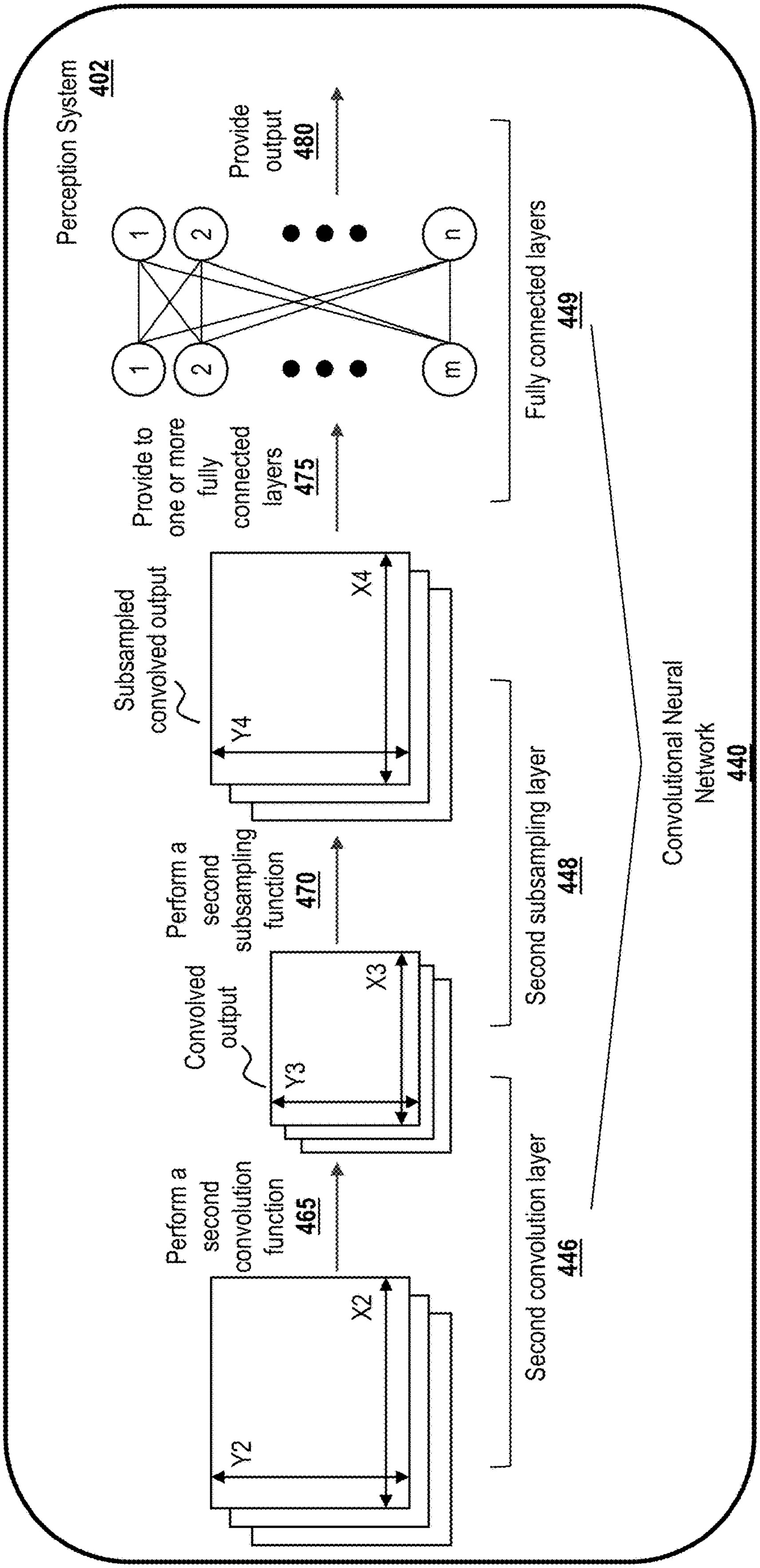

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Generating Bounding Boxes for Navigation

As described herein, to improve the functionality of an autonomous vehicle and its ability to identify objects in a scene, a system may be used to identify and generate annotations for unknown, unidentified, and/or unclassified objects. In some cases, the system may be configured to concurrently process hundreds, thousands, or millions of images (in real-time) to identify and generate annotations for the unknown, unidentified, and/or unclassified objects.

By identifying unknown, unidentified, and/or unclassified objects (at scale), the system can improve the autonomous vehicle's ability to accurately identify objects and improve ground truth data used to train machine learning models. Moreover, in some cases, by storing annotations of unknown, unidentified, and/or unclassified objects, the system can reduce the size and amount of data stored. This can improve storage utilization and efficiency. Accordingly, it will be understood that the examples and embodiments described herein can improve the technical fields of at least computer vision and autonomous vehicles.

Figure 5:
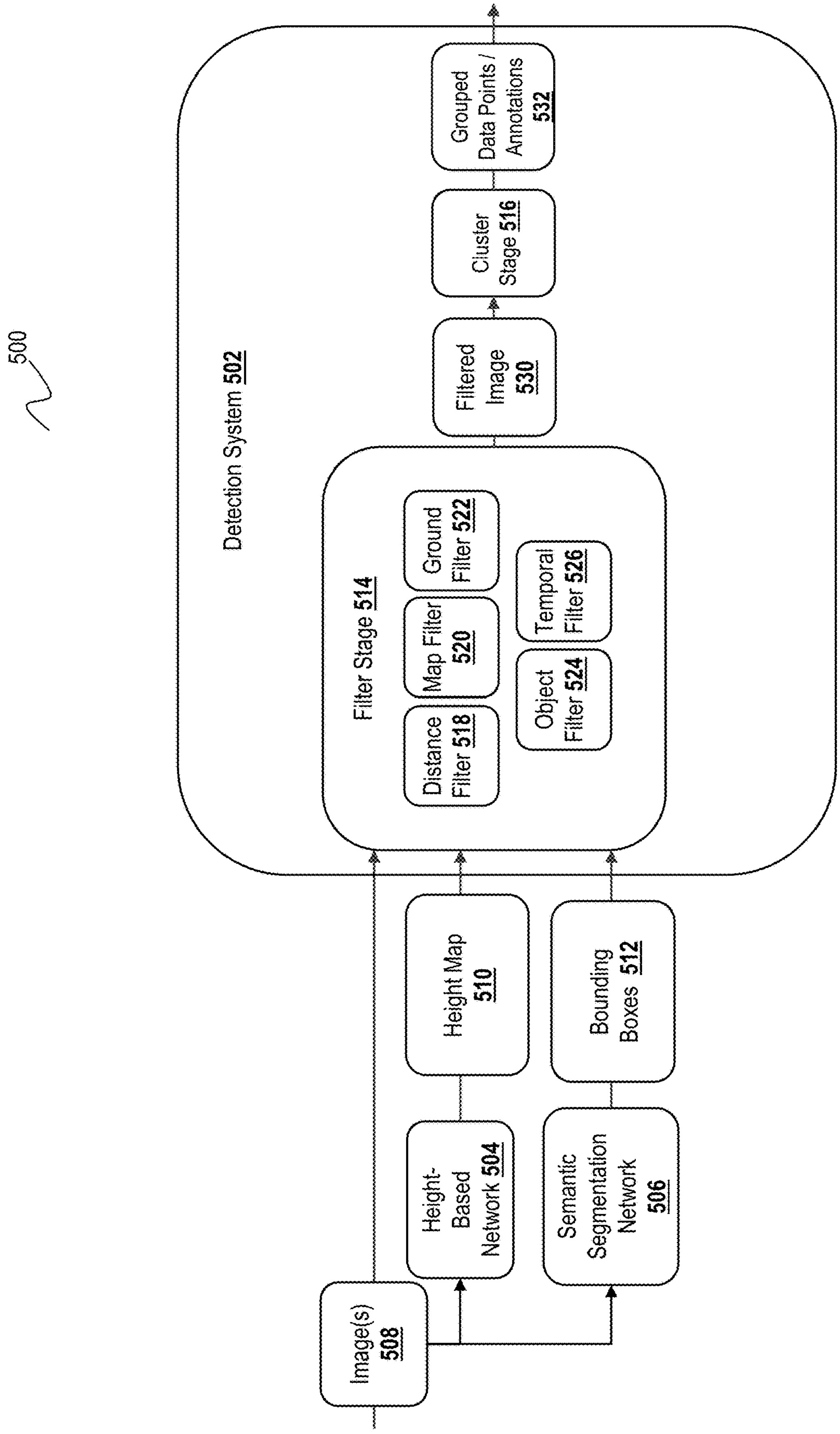
FIG. 5 is a block diagram illustrating an example object detection environment to identify unknown or unclassified objects.

FIG. 5 is a block diagram illustrating an example object detection environment 500 to identify unknown or unclassified objects. In the illustrated example, the object detection environment 500 includes an object detection system 502, a height-based network 504, and a classification network 506. It will be understood, however, that the object detection environment 500 may include fewer or more components. For example, in some cases, the height-based network 504 and/or classification network 506 may be omitted.

In the illustrated example, the detection system 502 identifies unknown or unclassified objects in the image 508 using the image 508, a height map 510 from the height-based network 504, and one or more bounding boxes 512 from the classification network 506, however, it will be understood that the object detection system 502 may identify unknown objects using fewer or more data. In some cases, the object detection system 502 may identify unknown objects using any one or any combination of the image 508, the height map 510, and/or bounding boxes 512. For example, the object detection system 502 may identify unknown objects using the image 508 (or images 508) without using the height map 510 or the bounding boxes 512, using the image 508 and height map 510, or using the image 508 and bounding boxes 512. In some such cases, the height-based network 504 and/or classification network 506 may be omitted.

The image 508 may be one of many images generated by or streaming from an image sensor. In some cases, the image 508 may be a 3D image that includes (3D) data points or image data points with location data associated with a location of the respective data point (e.g., x, y, z location of the data point). For example, the (3D) image 508 may be a lidar point cloud that includes multiple lidar points. Some or all of the lidar points may include an x, y, and z coordinates indicating a location of an object that reflected light. As another example, the (3D) image 508 may be a radar point cloud that includes multiple radar points that include location data associated with a location of an object that reflected a radio wave. As another example, the (3D) image 508 may be a stereo image that includes multiple data points that include location data for objects captured by a camera sensor.

The location data associated with a data point of an image 508 may refer to a geographic location (e.g., location in real world coordinates) and/or a relative location (e.g., location relative of the data point relative to an image sensor, the vehicle, or other object).

It will be understood that the processing, filtering, and clustering described herein with the image 508 may be repeated on some or all of the images streaming from an image sensor in real-time. Moreover, the system 502 may process, filter and cluster data points from multiple images concurrently (e.g., process multiple images at the same time using parallel processing).

In certain cases, an unknown object or unclassified object may correspond to one or more data points of an image that were not classified as a known object by a machine learning model (e.g., by the classification network 506) and/or that had a classification probability that does not satisfy a classification probability threshold. For example, the object detection system 502 may consider data points of the image 508 associated with (or having) a classification probability of less than 0.5 (or some other classification probability threshold) for some or all potential object classifications as being unknown or unclassified.

In the illustrated example, the height-based network 504 generates a height map using the image 508. Depending on the type of image (e.g., lidar, radar, camera), different types of height-based network 504 may be used. For example, if the image 508 is a lidar image (e.g., a lidar point cloud), the height-based network 504 may be a lidar segmentation network, such as but not limited to LSN GPE, configured to generate a height map. As another example, if the image 508 is a radar image (e.g., a radar point cloud), the height-based network 504 may be a radar segmentation network, configured to generate a height map. As yet another example, if the image 508 is a stereo image, the height-based network 504 may be camera image-based semantic segmentation network configured to generate a height map.

In some cases, there may be a lag to generate the height map 510 from the image 508. In some such cases, the height map 510 used by the object detection system 502 with the image 508 may correspond to an image received earlier in time than the image 508 (e.g., an image received one or more hundred milliseconds before the image 508, etc.). For example, the height-based network 504 may use an image received at t−1 to generate the height map 510 that is used to filter data points from the image 508. However, in certain cases, the object detection system 502 can delay processing or filtering the image 508 until the height-based network 504 generates the height map 510 from the image 508.

In the illustrated example, the classification network 506 identifies and classifies objects within the image 508 and/or generates bounding boxes 512 for the objects. Depending on the type of image (e.g., lidar, radar, camera), different types of classification network 506 may be used. For example, if the image 508 is a lidar image (e.g., a lidar point cloud), the classification network 506 may be a lidar segmentation network configured to identify objects using lidar data. As another example, if the image 508 is a radar image (e.g., a radar point cloud), the classification network 506 may be a radar segmentation network configured to identify objects using radar data. As yet another example, if the image 508 is a stereo image, the height-based network 504 may be camera image-based semantic segmentation network configured to identify objects using camera images and/or stereo camera images.

Moreover, the classification network 506 may be trained to generate bounding boxes for the objects in the image 508. The bounding boxes 512 may include one or more points or data structures (e.g., a tensor) that indicate the location, orientation, height, width, and/or length of the bounding box and/or the classification of the object associated with (e.g., the object inside the bounding box) the bounding box.

In some cases, there may be a lag to generate the bounding boxes 512 from the image 508. In some such cases, the bounding boxes 512 used by the object detection system 502 with the image 508 may correspond to an image received earlier in time than the image 508 (e.g., one or more hundred milliseconds before the image 508, etc.). For example, the classification network 506 may use an image received at t−1 to generate the bounding boxes 512 that are used to filter data points from the image 508. However, in certain cases, the object detection system 502 can delay processing or filtering the image 508 until the classification network 506 generates the bounding boxes 512 from the image 508.

In the illustrated example, the object detection system 502 includes a filter stage 514 and a cluster stage 516, however, it will be understood that the object detection system 502 may include fewer or more components as desired. In some cases, the object detection system 502 may omit the filter stage 514 or the cluster stage 516. For example, filtered data points may be output by the object detection system 502 (e.g., by the filter stage 514) without being clustered or grouped (e.g., by the cluster stage 516).

In the illustrated example, in the filter stage 514, the object detection system 502 uses the image 508, the height map 510, and the bounding boxes 512 to generate a filtered image 530 (from the image 508), however, it will be understood that the filter stage 514 may use any one or any combination of the image 508, height map 510, and/or bounding boxes 512 to generate the filtered image 530. For example, the filter stage 514 may generate the filtered image 530 without the bounding boxes 512 and/or without the height map 510.

In the illustrated example, the filter stage 514 includes a distance filter 518, a map filter 520, a ground filter 522, an object filter 524, and a temporal filter 526, however, it will be understood that the filter stage 514 may include fewer or more filters as desired. In some cases, the filter stage 514 includes any one or any combination of the distance filter 518, map filter 520, ground filter 522, object filter 524, and/or the temporal filter 526. The various filters of the filter stage 514 may be used to filter one or more data points of the image 508.

The distance filter 518 may be used to filter data points in the image 508 that satisfy one or more distance thresholds based on a distance from the vehicle 200 and/or sensor that generated the image 508. In some cases, the distance filter 518 may be used to remove data points that are too close or too far away from the vehicle 200 and/or the corresponding sensor. For example, the distance filter 518 may remove data points that are closer to the vehicle 200 (or sensor) than a first distance threshold and/or remove data points that are farther away from the vehicle 200 (or sensor) than a second distance threshold.

The map filter 520 may be used to filter data points in the image 508 that fall on certain portions of a map (e.g., an annotated or semantic map). Accordingly, although not shown in FIG. 5, it will be understood that the object detection system 502 may receive a determined location of the vehicle 200 (e.g., from the localization system 406 or from a recorded location). Using the determined location of the vehicle 200, the object detection system 502 may obtain map data associated with a map of the environment of the vehicle 200. The map data may include one or more annotations that classify points on the map. For example, the map data may identify a drivable area (e.g., road, etc.) and a non-drivable area (e.g., curb, sidewalks, buildings, grass, etc.) on the map. As at least part of the map filter 520, the object detection system 502 may compare the location of the data points (from the image 508) relative to the map and remove the data points that are located on or over the non-drivable areas of the map. For example, the object detection system 502 may compare an x and y coordinate of the data points (e.g., from a bird's eye view perspective) of the image 508 with x and y coordinates of non-drivable areas of the map (e.g., from a bird's eye view perspective). The object detection system 502 may remove data points of the image 508 that have x and y coordinates that match the x and y coordinates of the non-drivable area.

The ground filter 522 may be used to filter data points in the image 508 that correspond to the ground or the sky or satisfy one or more height thresholds. In some cases, as part of the ground filter 522, the object detection system 502 may remove data points that are higher than a first height threshold (e.g., too high, or likely part of the sky) or lower than a second height threshold (e.g., too low, or likely part of the ground). In some such cases, the object detection system 502 may remove data points from the image 508 based on a comparison of the height of the data point (e.g., location along the z-axis, from a bird's eye view perspective) with different (predetermined) thresholds. In some such cases, the thresholds may correspond to a height of the vehicle and/or a predetermined height above ground (e.g., six inches, etc.). Moreover, in some such cases, the height-based network 504 may be omitted.

In some cases, as the road may be inclined, declined, or non-uniform (e.g., with divots, bumps, slanted up/down or sideways), the object detection system 502 may use a height map 510 received (e.g., received from the height-based network 504) to determine the appropriate height thresholds to use to filter the data points based on their height.

The object filter 524 may be used to filter data points in the image 508 that correspond to known or classified objects. As described herein, the classification network 506 may identify and classify objects in the image 508 and/or generate one or more bounding boxes 512 of the identified/classified objects. As part of the object filter 524, the object detection system 502 may compare the bounding boxes 512 or the classified objects from the classification network 506 with the data points in the image 508, and remove the data points from the image 508 that correspond to a bounding boxes 512 (e.g., fall within the boundaries of a bounding boxes 512) and/or a classified object (e.g., remove a data point in the image 508 that corresponds to a data point in the output of the classification network 506 that has been classified as part of an identified object).

The temporal filter 526 may be used to filter data points in the image 508 based on time. In some cases, the temporal filter 526 may filter data points that do not have a corresponding data point in an earlier image. For example, data points that result from noise or aberrations may be transient from one image to another (consecutive or close-in-time) image. Accordingly, the object detection system 502 may compare data points from the image 508 with data points in a previous image (e.g., immediately preceding image and/or image generated within a threshold time period prior to the image 508). If the data point in the image 508 does not correspond to a data point in the previous image, the object detection system 502 may remove the data point from the image. In some cases, the object detection system 502 may use an image distance threshold to determine whether a data point in an earlier image correspond to the data point in the image 508. For example, when searching for a corresponding data point, the object detection system 502 may search for data points in the earlier image that are within the image distance threshold.

In some cases, the image distance threshold may depend on the speed of the vehicle and/or direction of travel. For example, the object detection system 502 may use a larger image distance threshold when the vehicle is traveling faster and a smaller image distance threshold when the vehicle is traveling slower. In certain cases, the image distance threshold may be for a particular direction. For example, if the vehicle is traveling in a direction that causes objects in images to move left to right over time, the image distance threshold may indicate that data points in the earlier image are to be to the left of the data point in the image 508.

In the illustrated example, in the cluster stage 516, the object detection system 502 generates grouped data points 532 from the filtered image 530. In some cases, the grouped data points 532 may be referred to as an unknown or unclassified object. In addition, in certain cases, the object detection system 502 may generate one or more annotations for the grouped data points 532. For example, the object detection system 502 may generate a bounding box for the grouped data points 532 that surrounds or includes some or all of the grouped data points 532. In certain cases, the object detection system 502 may generate an annotation for the grouped data points 532 indicating that they are part of an unknown or unclassified object.

As part of grouping data points, the object detection system 502 may identify multiple unknown or unclassified objects from the image 508. In some such cases, the object detection system 502 may separately identify and/or track the various unknown/unclassified objects in the image 508 and generate separate annotations for each (e.g., separate bounding boxes or tracking numbers, etc.). In this way, the object detection system 502 may track multiple unknown objects in an image.

Data Flow Examples

Figure 6A:
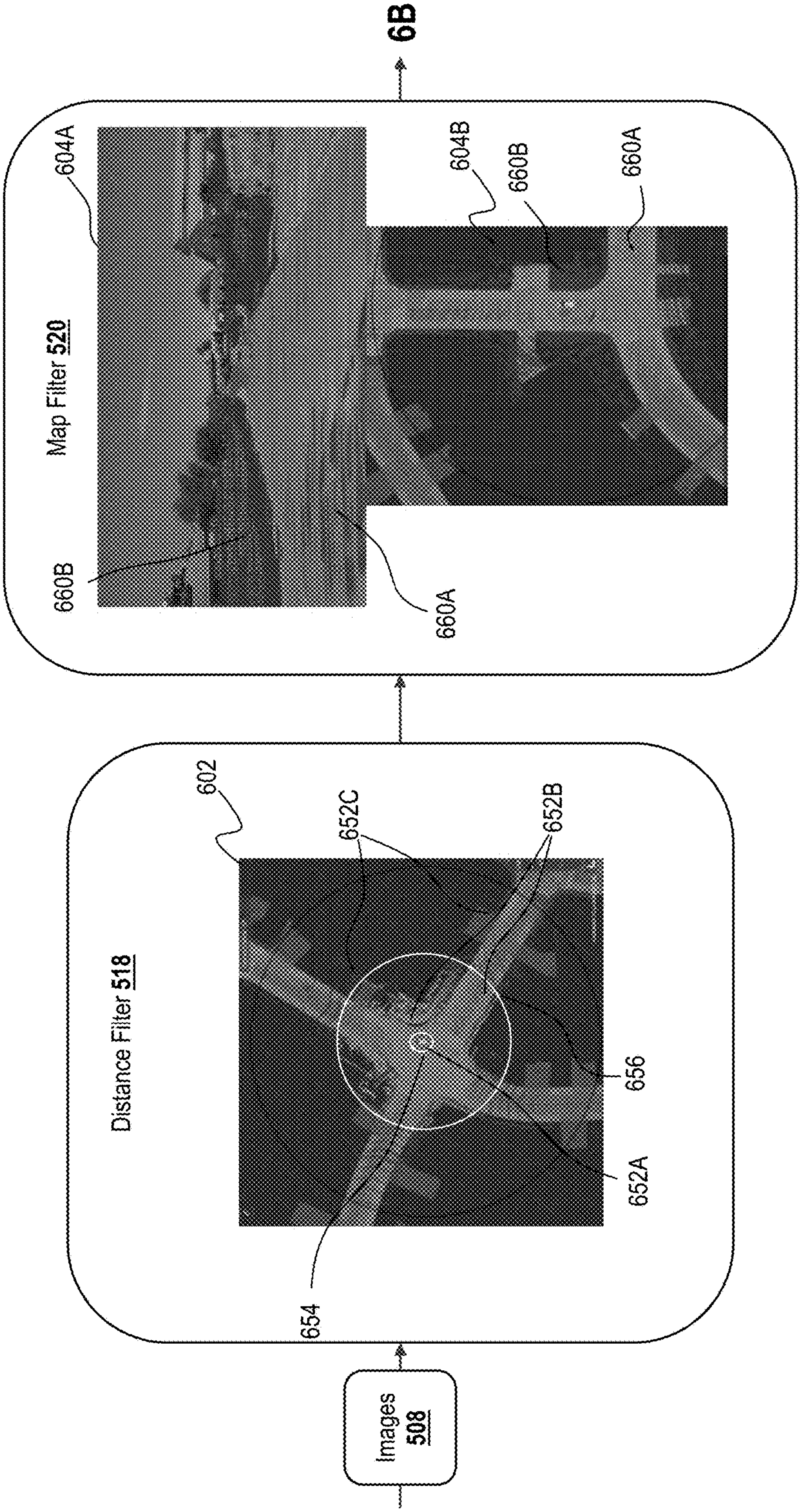
FIGS. 6A and 6B are data flow diagrams illustrating an example of an image being processed by an object detection system.
Figure 6B:
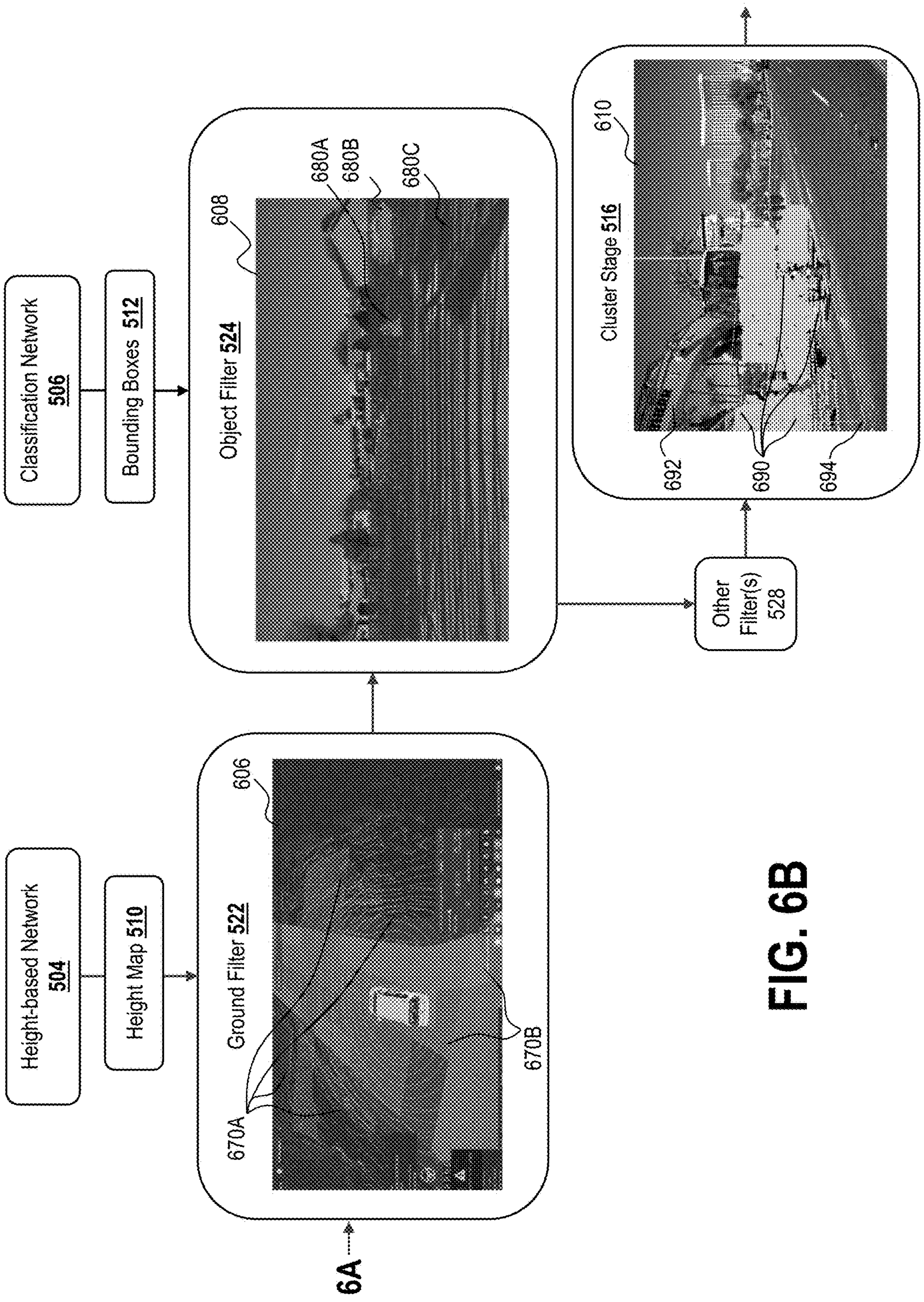

FIGS. 6A and 6B are data flow diagrams illustrating an example of an image 508 being processed by the object detection system 502. Although the example described in FIGS. 6A and 6B is shown and described as applying certain filters in a particular sequence, it will be understood that any combination of filters may be used in any order. Thus, the illustrated example should not be construed as limiting.

Although the present example is described with reference to the object detection system 502 processing an image 508, it will be understood that the object detection system 502 may simultaneously or concurrently process hundreds, thousands, millions, or more images 508. Moreover, the object detection system 502 may receive a stream of images in real-time or near real-time and process the stream of images in real-time or near real-time to identify the unknown objects found therein.

Moreover, as part of processing the image(s) 508, the object detection system 502 may use one or more machine learning models. For example, the system may use one machine learning model to identify objects in the images 508, another machine learning model to determine height thresholds, and another machine learning model to group data points of the images and/or generate bounding boxes for the grouped data points, etc. Accordingly, it will be understood that the system and processes described herein may improve computer vision in autonomous vehicles and may integrate various machine learning models to as part of the improvement to computer vision in autonomous vehicles.

In the illustrated example, the object detection system 502 receives the image 508 and applies the distance filter 518 to the object detection system 502. As described herein, as part of the distance filter 518, the object detection system 502 may remove data points from the image 508 (or image 602) that satisfy one or more distance thresholds.

The image 602 is an example illustration from a bird-eye view of how the object detection system 502 may apply the distance filter 518 to the image 508. In the image 602, the ego vehicle 650 is surrounded by data points 652A, 652B, 652C (individually or collectively referred to as data points 652), which may be indicative of lidar points, radar points, or other 3D data points, a first circle 654 representing a first (near) distance threshold, and a second circle 656 representing a second (far) distance threshold. The data points that satisfy a first (near) threshold distance (e.g., data points 652A that are closer than the first threshold distance or inside the first circle 654) and the data points that satisfy a second (far) threshold (e.g., data points 652C that are farther than a second threshold distance or outside the second circle 656) may be removed from the image 602, leaving the data points that do not satisfy either threshold distance (e.g., the data points 652B that fall between the threshold distances).

FIG. 6A further illustrates an example of the object detection system 502 applying the map filter 520 to the output of the distance filter 518. As described herein, as part of the map filter 520, the object detection system 502 may remove data points from the image 508 (or images 604A, 604B) that correspond to a non-drivable area of a map (e.g., an annotated or semantic map).

The images 604A and 604B are example illustrations from the point of view of the vehicle (image 604A) and from a birds-eye view (image 604B) of how the object detection system 502 may apply the map filter 520 to the image 508 or the output of the distance filter 518. The images 604A and 604B show data points around the vehicle that the object detection system 502 determines are within a drivable area 660A and data points around the vehicle that the object detection system 502 determines to be outside the drivable area 660B. As described herein, this may entail determining a location of the vehicle, identifying map data associated with a map that corresponds to the determined location of the vehicle, and comparing location information of the data points in the image 508 (or image 602) with the different portions of the map data to identify data points that are located on or above an area in the map identified or classified as a non-drivable area As part of the map filter 520, the data points outside of the drivable area may be removed from the image 508 (or image 602).

Turning to FIG. 6B, the object detection system 502 applies the ground filter 522 to the output of the map filter 520 to remove data points from the image 508 that satisfy one or more height thresholds. In the illustrated example, the object detection system 502 uses a height map from the height-based network 504 to filter the data point from the image 508. The height map may take into account the steepness of the road, etc. and enable to ground filter 522 to more accurately identify data points that satisfy the different height thresholds.

It will be understood, however, that in some cases, as part of the ground filter 522, the object detection system 502 removes the data points without input from the height-based network 504. For example, the object detection system 502 may compare a height of the data points with one or more (predetermined) height thresholds and remove data points that satisfy at least one (predetermined) height thresholds (e.g., are above one height threshold or below another height threshold).

In some cases, the object detection system 502 may use the ground filter 522 to remove data points that satisfy a first (low) height threshold (e.g., data points below a first threshold height) and data points that satisfy a second (high) height threshold (e.g., data points above a second threshold height).

The image 606 is an example illustration from an aerial point of view of how the object detection system 502 may apply the ground filter 522 to the image 508 or the output of the map filter 520. The image 606 shows data points around the vehicle that satisfy the first height threshold or the second height threshold 670A and data points around the vehicle that do not satisfy at least one of the first or second height threshold 670B. As part of the ground filter 522, the object detection system 502 may remove data points from the image 508 (or image 606) that satisfy the first height threshold or the second height threshold.

FIG. 6B further illustrates an example of the object detection system 502 applying the object filter 524 to the output of the ground filter 522 to remove data points from the image 508 (or the image 608) that are identified as belonging to one or more known or classified objects.

In the illustrated example, as part of the object filter 524, the object detection system 502 uses the bounding boxes 512 (or semantic image data) to filter the data points from the image 508 or the output of the ground filter 522. The bounding boxes 512 may indicate data points within the image 508 that have been classified as part of a known object (e.g., vehicle, bicycle, pedestrian, etc.) and enable the object detection system 502 to more accurately identify data points that are not part of a known object. In some cases, the object detection system 502 may use the ground filter 522 to remove data points that are identified as being part of a known or classified object.

The image 608 is an example illustration from the point of view of the vehicle of the object detection system 502 applying the object filter 524 to the image 508 or the output of the ground filter 522. The image 608 shows data points 680A, 680B around the vehicle that are identified as being part of some object in the image 608 (different data points 680A, 680B may be identified as being part of different objects) and data points 680C around the vehicle that are identified as not being part of an object. As part of the object filter 524, the object detection system 502 may remove the data points 680A, 680B from the image 508 (or image 608) identified as being part of a classified object.

Although not illustrated in the various images 602-608, when the object detection system 502 applies the filters 518-524 (or the temporal filter 526) successively, the output of each filter may include fewer data points than the output of a previous filter. In this way, the remaining data points of the image 508 may be fewer and fewer as the image 508 progresses through the filter stage 514.

As described herein, the object detection system 502 may apply the cluster stage 516 to the output of the filter stage 514 (e.g., to the data points that remain in the image 508 after one or more filters 518-526 have been applied) to group data points that remain in the image 508. For example, as part of the cluster stage 516, the object detection system 502 may group data points based on a relative location to each other. In addition, the object detection system 502 may use the cluster stage 516 or output of the cluster stage 516 to generate one or more bounding boxes around the grouped data points. In some cases, the object detection system 502 may discard the grouped data points in favor of bounding boxes. In some such cases, using bounding boxes to identify unidentified or unclassified objects rather than (semantically labeled) individual data points may reduce the amount of data stored/process by the object detection system 502, etc.

The image 610 is an example illustration from the point of view of the vehicle of the object detection system 502 grouping data points of the image 508 (or the image 608). The image 610 shows data points 690 that have been grouped together as part of an unknown, unidentified, or unclassified object 692 (an excavator in the illustrated example). The image 610 further shows a bounding box 694 that has been drawn around the object 692. In some cases, the object detection system 502 may use a machine learning model to determine/draw the bounding box 694.

Flow Example

Figure 7:
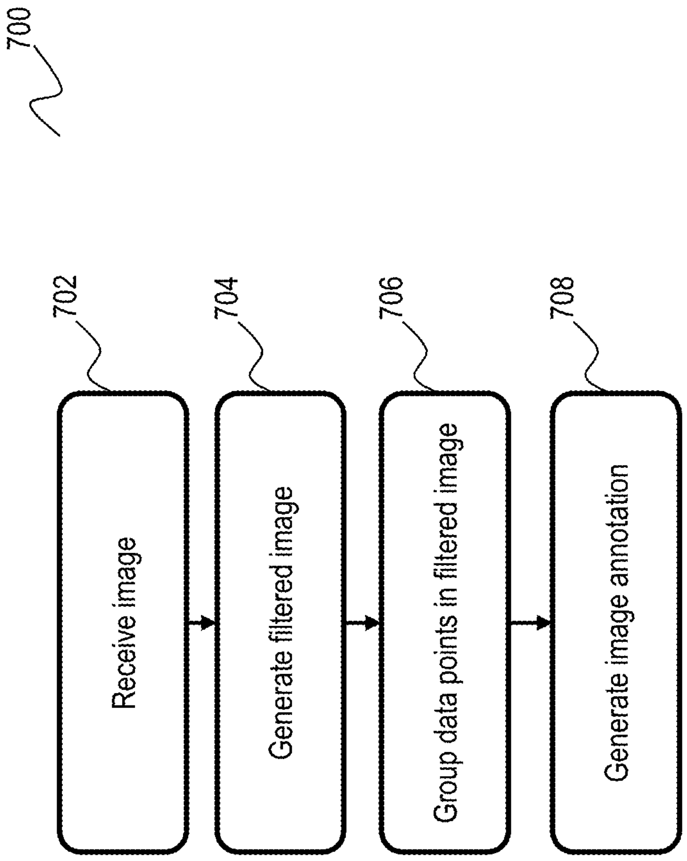
FIG. 7 is a flow diagram illustrating an example of a routine implemented by at least one processor to identify an unknown or unclassified object.

FIG. 7 is a flow diagram illustrating an example of a routine 700 implemented by at least one processor to identify an unknown or unclassified object. The flow diagram illustrated in FIG. 7 is provided for illustrative purposes only. It will be understood that one or more of the steps of the routine illustrated in FIG. 7 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components and/or the autonomous vehicle compute 400 may be used.

At block 702, the object detection system 502 receives an image of a vehicle scene. As described herein, the image may be a 3D image and may correspond to an image received from an image sensor, such as a lidar image sensor located on a vehicle at a particular time. Accordingly, in some cases, the image may be a lidar image or lidar point cloud. In certain cases, the image may correspond to a radar image (or radar point cloud) or stereo image that is formed from one or more images. Moreover, the (3D) image may include various data points that include location information. In some cases, the data points may be 3D data points that provide three-dimensional location data. For example, if the image is a lidar point cloud or radar point cloud, the (3D) data points may include location information that indicates an x, y, z location of an object that reflected light waves or radio waves, respectively. If the image is a stereo image, the (3D) data points may indicate a location of a point in the image.

At block 704, the object detection system 502 generates a filtered image from the received image. As described herein, the object detection system 502 may generate the filtered image in a variety of ways using one or more filters, such as but not limited to, a distance filter, map filter, ground filter, object filter, temporal filter, and/or other filters, etc.

In some cases, the object detection system 502 may generate the filtered image by removing any one or any combination of data points that satisfy one or more threshold distances from the vehicle or image sensor (e.g., data points that are closer than a first threshold distance or farther than a second threshold distance), data points located outside of a drivable area (e.g., by comparing the location information of the data points with a semantic or annotated map that indicates drivable areas and non-drivable areas within the map), data points that satisfy one or more height thresholds (e.g., data points that are below a first threshold height or above a second threshold height), data points associated with at least one identified or classified object (e.g., data points associated with semantic information that indicates a probability above a particular threshold that the data point likely belongs to a particular object), and/or data points that do not have a corresponding data point in an earlier image (e.g., data points that do not register across multiple images or frames or do not have corresponding data points (within a threshold distance) that register across multiple images or frames), etc.

At block 706, the object detection system 502 groups a plurality of data points in the filtered image. As described herein, the object detection system 502 may group the plurality of data point in the filtered image in a variety of ways. In some cases, the object detection system 502 groups the plurality of data points based on a location of the plurality of data points relative to each other and/or relative to other data points in the filtered image. In certain cases, the object detection system 502 groups the plurality of data points using a trained machine learning model trained to group data points. In certain cases, the object detection system 502 generates multiple groups of data points.

At block 708, the object detection system 502 generates an annotation for the grouped plurality of data points. As described herein, the object detection system 502 may generate the annotation in a variety of ways. In some cases, the annotation may include a bounding box that surrounds or encompasses some or all of the grouped plurality of data points. In certain cases, the annotation may include a classification for some or all of the data points. For example, the annotation may indicate that the data points are associated with an unknown, unclassified, or unidentified object. In some cases, such as when the object detection system 502 generates multiple groups of data points, the object detection system 502 may generate respective annotations for some or all of the groups of data points.

In some cases, the object detection system 502 may store the bounding box information for later use. In some such cases, the object detection system 502 may not save or may delete the plurality of data points and/or the information related to the plurality of data points that correspond to the bounding box. In certain cases, by deleting the information related to the individual data points (and storing the information related to the bounding box), the object detection system 502 may reduce the amount of data stored and/or transmitted.

Fewer, more, or different steps may be included in the routine 700. In some cases, block 708 may be omitted. In some such cases, the grouped plurality of data points may be communicated to another computing device for a user to annotate, etc.

Although the examples described herein often refer to the use of lidar-based images and processing, it will be understood that other types of images may be used. For example, the image 508 may be a stereo image formed from two images generated by image sensors a known distance apart. In some such cases, lidar segmentation networks may be replaced with camera-based networks. These camera-based networks may generate the height map 510 and bounding boxes 512, but in a different (e.g., camera based) format. Moreover, in cases where a stereo image is used, the data points may refer to pixels having location coordinates (e.g., x, y, z coordinates).

EXAMPLES

Various example embodiments of the disclosure can be described by the following clauses:

Clause 1. A method, comprising: receiving a 3D image of an environment of an autonomous vehicle, the 3D image including a plurality of 3D data points, wherein at least one 3D data point of the plurality of 3D data points indicates a location of the at least one 3D data point in three dimensions; generating a filtered 3D image from the received 3D image, wherein generating the filtered 3D image comprises: removing at least one 3D data point from the 3D image that satisfies a threshold distance from the autonomous vehicle, removing at least one 3D data point from the 3D image that is located outside of a drivable area, wherein the drivable area is identified based on map data associated with a map of the environment of the autonomous vehicle, removing at least one 3D data point from the 3D image that satisfies a height threshold, and removing at least one 3D data point from the 3D image that corresponds to at least one identified object within the environment, wherein the at least one identified object is identified using a machine learning model configured to identify objects in images; identifying at least one group of 3D data points in the filtered 3D image; and generating an image annotation based on the at least one group of 3D data points.

Clause 2. The method of clause 1, wherein the threshold distance is a first threshold distance, the method further comprising removing at least one 3D data point that satisfies a second threshold distance.

Clause 3. The method of clause 2, wherein the at least one 3D data point that satisfies the first threshold distance is closer to the autonomous vehicle than the first threshold distance and the at least one 3D data point that satisfies the second threshold distance is farther away from the autonomous vehicle than the second threshold distance.

Clause 4. The method of any of clauses 1-3, wherein removing at least one 3D data point from the 3D image that is located outside of a drivable area comprises: obtaining the map data associated with the map, identifying the drivable area within the map based on the map data, and removing the at least one 3D data point from the 3D image that is located outside of the identified drivable area.

Clause 5. The method of any of clauses 1-4, wherein the height threshold is a first height threshold, the method further comprising removing at least one 3D data point that satisfies a second height threshold.

Clause 6. The method of clause 5, wherein the at least one 3D data point that satisfies the first height threshold is lower than the first height threshold and the at least one 3D data point that satisfies the second height threshold is higher than the second height threshold.

Clause 7. The method of any of clauses 1-6, wherein the threshold distance is a first threshold distance and wherein generating the filtered 3D image further comprises: removing at least one 3D data point from the 3D image that does not have a corresponding 3D data point in a subsequent 3D image that is within a second threshold distance.

Clause 8. The method of any of clauses 1-7, wherein removing at least one 3D data point from the 3D image that corresponds to at least one identified object within the environment comprises: receiving an image of the environment from a camera, identifying, using the machine learning model, at least one object within the image, and removing the at least one 3D data point from the 3D image that corresponds to the at least one identified object.

Clause 9. The method of any of clauses 1-8, wherein generating an image annotation comprises generating a 3D bounding box that surrounds the at least one group of 3D data points.

Clause 10. A system, comprising: a data store storing computer-executable instructions; and at least one processor configured to: receive a 3D image of an environment of an autonomous vehicle, the 3D image including a plurality of 3D data points, wherein at least one 3D data point of the plurality of 3D data points indicates a location of the at least one 3D data point in three dimensions; generate a filtered 3D image from the received 3D image, wherein to generate the filtered 3D image, the at least one processor is configured to: remove at least one 3D data point from the 3D image that satisfies a threshold distance from the autonomous vehicle, remove at least one 3D data point from the 3D image that is located outside of a drivable area, wherein the drivable area is identified based on map data associated with a map of the environment of the autonomous vehicle, remove at least one 3D data point from the 3D image that satisfies a height threshold, and remove at least one 3D data point from the 3D image that corresponds to at least one identified object within the environment, wherein the at least one identified object is identified using a machine learning model configured to identify objects in images; identify at least one group of 3D data points in the filtered 3D image; and generate an image annotation based on the at least one group of 3D data points.

Clause 11. The system of clause 10, wherein the threshold distance is a first threshold distance, wherein the at least one processor is further configured to remove at least one 3D data point that satisfies a second threshold distance.

Clause 12. The system of clause 11, wherein the at least one 3D data point that satisfies the first threshold distance is closer to the autonomous vehicle than the first threshold distance and the at least one 3D data point that satisfies the second threshold distance is farther away from the autonomous vehicle than the second threshold distance.

Clause 13. The system of any of clauses 10-12, wherein to remove at least one 3D data point from the 3D image that is located outside of a drivable area, the at least one processor is configured to: obtain the map data associated with the map, identify the drivable area within the map based on the map data, and remove the at least one 3D data point from the 3D image that is located outside of the identified drivable area.

Clause 14. The system of any of clauses 10-13, wherein the height threshold is a first height threshold, wherein the at least one processor is further configured to remove at least one 3D data point that satisfies a second height threshold.

Clause 15. The system of clause 14, wherein the at least one 3D data point that satisfies the first height threshold is lower than the first height threshold and the at least one 3D data point that satisfies the second height threshold is higher than the second height threshold.

Clause 16. The system of any of clauses 10-15, wherein the threshold distance is a first threshold distance and wherein to generate the filtered 3D image, the at least one processor is further configured to: remove at least one 3D data point from the 3D image that does not have a corresponding 3D data point in a subsequent 3D image that is within a second threshold distance.

Clause 17. The system of any of clauses 10-16, wherein to remove at least one 3D data point from the 3D image that corresponds to at least one identified object within the environment, the at least one processor is configured to: receive an image of the environment from a camera, identify, using the machine learning model, at least one object within the image, and remove the at least one 3D data point from the 3D image that corresponds to the at least one identified object.

Clause 18. The system of any of clauses 10-17, wherein to generate an image annotation, the at least one processor is configured to generate a 3D bounding box that surrounds the at least one group of 3D data points.

Clause 19. A non-transitory computer-readable media comprising computer-executable instructions that, when executed by a computing system, causes the computing system to: receive a 3D image of an environment of an autonomous vehicle, the 3D image including a plurality of 3D data points, wherein at least one 3D data point of the plurality of 3D data points indicates a location of the at least one 3D data point in three dimensions; generate a filtered 3D image from the received 3D image, wherein to generate the filtered 3D image, execution of the computer-executable instructions cause the computing system to: remove at least one 3D data point from the 3D image that satisfies a threshold distance from the autonomous vehicle, remove at least one 3D data point from the 3D image that is located outside of a drivable area, wherein the drivable area is identified based on map data associated with a map of the environment of the autonomous vehicle, remove at least one 3D data point from the 3D image that satisfies a height threshold, and remove at least one 3D data point from the 3D image that corresponds to at least one identified object within the environment, wherein the at least one identified object is identified using a machine learning model configured to identify objects in images; identify at least one group of 3D data points in the filtered 3D image; and generate an image annotation based on the at least one group of 3D data points.

Clause 20. The non-transitory computer-readable media of clause 19, wherein to remove at least one 3D data point from the 3D image that is located outside of a drivable area, execution of the computer-executable instructions further cause the computing system to: obtain the map data associated with the map, identify the drivable area within the map based on the map data, and remove the at least one 3D data point from the 3D image that is located outside of the identified drivable area.

Additional Examples

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously recited step or entity.

What is claimed is:

1. A method, comprising:

receiving a first lidar point cloud of an environment of an autonomous vehicle, the first lidar point cloud including a first plurality of 3D lidar points, wherein at least one 3D lidar point of the first plurality of 3D lidar points indicates a location of the at least one 3D lidar point in three dimensions;

generating a filtered lidar point cloud from the received first lidar point cloud, wherein generating the filtered lidar point cloud comprises:

removing a first lidar point from the first lidar point cloud that satisfies a threshold distance from the autonomous vehicle, removing a second lidar point from the first lidar point cloud that is located outside of a drivable area, wherein the drivable area is identified based on map data associated with a map of the environment of the autonomous vehicle, removing a third lidar point from the first lidar point cloud that satisfies a height threshold, removing a fourth lidar point from the first lidar point cloud that corresponds to at least one identified object within the environment, wherein the at least one identified object is identified using a machine learning model configured to identify objects in images;

comparing the first lidar point cloud with a second lidar point cloud received prior to the first lidar point cloud; and based on the comparing, removing a fifth lidar point from the first lidar point cloud that does not have a corresponding lidar point in the second lidar point cloud;

identifying at least one group of lidar points in the filtered lidar point cloud; and generating an image annotation based on the at least one group of lidar points.

2. The method of claim 1, wherein the threshold distance is a first threshold distance, the method further comprising removing a sixth lidar point that satisfies a second threshold distance.

3. The method of claim 2, wherein the first lidar point that satisfies the first threshold distance is closer to the autonomous vehicle than the first threshold distance and the sixth lidar point that satisfies the second threshold distance is farther away from the autonomous vehicle than the second threshold distance.

4. The method of claim 1, wherein removing the second lidar point from the first lidar point cloud that is located outside of a drivable area comprises:

obtaining the map data associated with the map, identifying the drivable area within the map based on the map data, and removing the second lidar point from the first lidar point cloud that is located outside of the identified drivable area.

5. The method of claim 1, wherein the height threshold is a first height threshold, the method further comprising removing a sixth lidar point that satisfies a second height threshold.

6. The method of claim 5, wherein the third lidar point that satisfies the first height threshold is lower than the first height threshold and the sixth lidar point that satisfies the second height threshold is higher than the second height threshold.

7. The method of claim 1, wherein removing the fourth lidar point from the first lidar point cloud that corresponds to at least one identified object within the environment comprises:

receiving an image of the environment from a camera, identifying, using the machine learning model, at least one object within the image, and removing the fourth lidar point from the first lidar point cloud that corresponds to the at least one identified object.

8. The method of claim 1, wherein generating an image annotation comprises generating a 3D bounding box that surrounds the at least one group of lidar points.

9. A system, comprising:

a data store storing computer-executable instructions; and at least one processor configured to:

receive a first lidar point cloud of an environment of an autonomous vehicle, the first lidar point cloud including a plurality of 3D lidar points, wherein at least one 3D lidar point of the plurality of 3D lidar points indicates a location of the at least one 3D lidar point in three dimensions;

generate a filtered lidar point cloud from the received first lidar point cloud, wherein to generate the filtered lidar point cloud, the at least one processor is configured to:

remove a first lidar point from the first lidar point cloud that satisfies a threshold distance from the autonomous vehicle, remove a second lidar point from the first lidar point cloud that is located outside of a drivable area, wherein the drivable area is identified based on map data associated with a map of the environment of the autonomous vehicle, remove a third lidar point from the first lidar point cloud that satisfies a height threshold, remove a fourth lidar point from the first lidar point cloud that corresponds to at least one identified object within the environment, wherein the at least one identified object is identified using a machine learning model configured to identify objects in images, compare the first lidar point cloud with a second lidar point cloud received prior to the first lidar point cloud, and based on the comparing, remove a fifth lidar point from the first lidar point cloud that does not have a corresponding lidar point in the second lidar point cloud;

identify at least one group of lidar points in the filtered lidar point cloud; and generate an image annotation based on the at least one group of lidar points.

10. The system of claim 9, wherein the threshold distance is a first threshold distance, wherein the at least one processor is further configured to remove a sixth lidar point that satisfies a second threshold distance.

11. The system of claim 10, wherein the first lidar point that satisfies the first threshold distance is closer to the autonomous vehicle than the first threshold distance and the sixth lidar point that satisfies the second threshold distance is farther away from the autonomous vehicle than the second threshold distance.

12. The system of claim 9, wherein to remove the second lidar point from the first lidar point cloud that is located outside of a drivable area, the at least one processor is configured to:

obtain the map data associated with the map, identify the drivable area within the map based on the map data, and remove the second lidar point from the first lidar point cloud that is located outside of the identified drivable area.

13. The system of claim 9, wherein the height threshold is a first height threshold, wherein the at least one processor is further configured to remove a sixth lidar point that satisfies a second height threshold.

14. The system of claim 13, wherein the third lidar point that satisfies the first height threshold is lower than the first height threshold and the sixth lidar point that satisfies the second height threshold is higher than the second height threshold.

15. The system of claim 9, wherein to remove the fourth lidar point from the first lidar point cloud that corresponds to at least one identified object within the environment, the at least one processor is configured to:

receive an image of the environment from a camera, identify, using the machine learning model, at least one object within the image, and remove the fourth lidar point from the first lidar point cloud that corresponds to the at least one identified object.

16. The system of claim 9, wherein to generate an image annotation, the at least one processor is configured to generate a 3D bounding box that surrounds the at least one group of lidar points.

17. A non-transitory computer-readable media comprising computer-executable instructions that, when executed by a computing system, causes the computing system to:

receive a first lidar point cloud of an environment of an autonomous vehicle, the first lidar point cloud including a plurality of 3D lidar points, wherein at least one 3D lidar point of the plurality of 3D lidar points indicates a location of the at least one 3D lidar point in three dimensions;

generate a filtered lidar point cloud from the received first lidar point cloud, wherein to generate the filtered lidar point cloud, execution of the computer-executable instructions cause the computing system to:

remove a first lidar point from the first lidar point cloud that satisfies a threshold distance from the autonomous vehicle, remove a second lidar point from the first lidar point cloud that is located outside of a drivable area, wherein the drivable area is identified based on map data associated with a map of the environment of the autonomous vehicle, remove a third lidar point from the first lidar point cloud that satisfies a height threshold, and remove a fourth lidar point from the first lidar point cloud that corresponds to at least one identified object within the environment, wherein the at least one identified object is identified using a machine learning model configured to identify objects in images, compare the first lidar point cloud with a second lidar point cloud received prior to the first lidar point cloud, and based on the comparing, remove a fifth lidar point from the first lidar point cloud that does not have a corresponding lidar point in the second lidar point cloud;

identify at least one group of lidar points in the filtered lidar point cloud; and generate an image annotation based on the at least one group of lidar points.

18. The non-transitory computer-readable media of claim 17, wherein to remove the second lidar point from the first lidar point cloud that is located outside of a drivable area, execution of the computer-executable instructions further cause the computing system to:

obtain the map data associated with the map, identify the drivable area within the map based on the map data, and remove the second lidar point from the first lidar point cloud that is located outside of the identified drivable area.

* * * * *